March 4, 1924.

F. RACKEMANN

COTTON CLEANER

Filed March 1, 1923

1,485,410

Felix Rackemann,
INVENTOR,
By
Mitchell, Chadwick & Kent,
ATTORNEYS.

Patented Mar. 4, 1924.

1,485,410

UNITED STATES PATENT OFFICE.

FELIX RACKEMANN, OF MILTON, MASSACHUSETTS, ASSIGNOR TO THE MURRAY COMPANY, OF DALLAS, TEXAS, A CORPORATION OF TEXAS.

COTTON CLEANER.

Application filed March 1, 1923. Serial No. 621,994.

*To all whom it may concern:*

Be it known that I, FELIX RACKEMANN, a citizen of the United States, residing at Milton, in the county of Norfolk and State of Massachusetts, have invented certain new and useful Improvements in Cotton Cleaners, of which the following is a specification.

My invention is a beater drum, especially adapted for use in cotton cleaners, and consists in providing a hollow beater drum or drums, in such a mechanism, having perforations in the peripheral walls or surface of the drum, or drums, through which perforations, in operation, compressed air may be discharged.

The operation of the feeder or feeder-cleaner for cotton gins, is well known in the art and need not be described at length.

Figure 1:
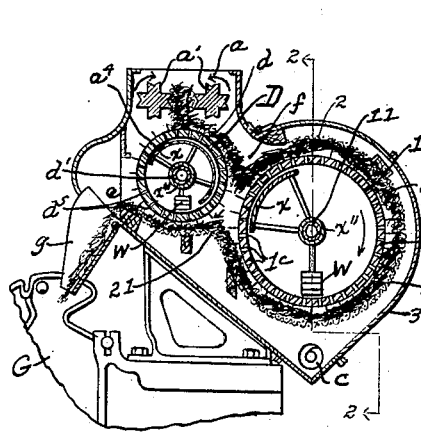
Figure 1 is a cross-sectional elevation of my improved cotton cleaner.
Figure 2:
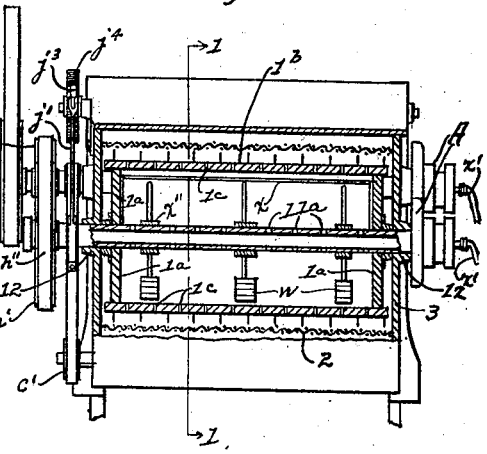
Figure 2 is a longitudinal sectional elevation of my improved cotton cleaner.
Figure 3:
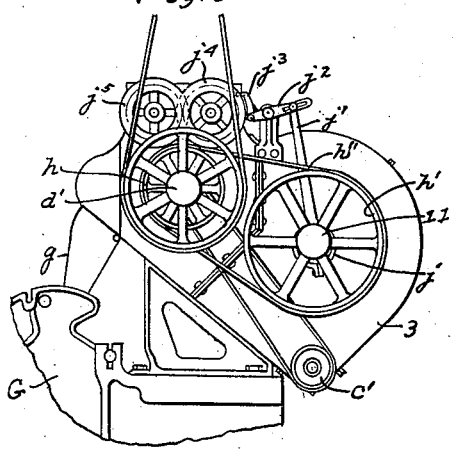
Figure 3 is an end elevation, showing the actuating mechanism.
Figure 4:
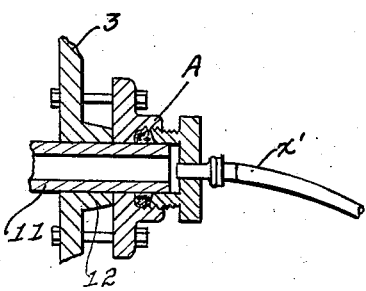
Figure 4 is a detail, on an enlarged scale, of the air connection.

In Figure 1 is shown a cleaner feeder, consisting of a drum, D, having upon its surface a multiplicity of spikes, $d$. This drum is set beneath a pair of feed rolls, $a'$, mounted above the drum, D, in a passage $a$. The drum D and feed rolls $a'$ rotate as indicated by the arrows. The seed cotton is passed between the rolls $a'$ $a'$ and is compressed slightly and formed into a loose bat, which as it descends, is received by the beater drum D and carried around by the spikes, $d$. The shaft $d'$ and the feed rolls $a'$ are provided with actuating pulleys and gears, outside the casing by means of which they are actuated from a source of power, all as is well known. To one side of the drum D is arranged a second drum or drums, 1, within a screened casing 2, 3, the screen being indicated by 2 and the casing by 3. Drum 1 is carried on hollow shaft 11 mounted in bearings 12 in the side of casing 3. The shaft 11 is vented at 11$^a$ within the drum, the ends of which drum are closed by heads 1$^a$. The peripheral walls 1$^b$ of the drum are perforated as at 1$^c$. On one end of the hollow shaft 11 is adjusted an air connection, A, within which the end of shaft 11 rotates, and this connection is connected by a suitable pipe, $x^1$, with a source of air under pressure.

A shield X, preferably covers that portion of the inner surface of the drum, 1, which is opposite the throat, $f$, and prevents the discharge of air through perforation 1$^c$ covered by the shield. As soon as the bat, which is deposited on the outer surface of drum 1, passes above that shield, compressed air from within the drum, which has entered through air box A, hollow shaft 11 and vents 11$^a$, is emitted through perforations 1$^c$ beneath the cotton and tends to lift and open and hold it against the screen 2, the air passing through the cotton and the screen, carrying dust and trash from the cotton. The screen 2 is preferably so spaced from the drums that the cotton cannot be forced by the outwardly moving air, beyond the ends of the spikes $d$. The cotton is pushed along by the spikes, $d$, and held against the screen 2, until it reaches point 21 between drums, when the bat passes to the under side of drum D and is pushed to the exit, $e$, and the chute, $g$, down which it passes to the gin, indicated at G.

The feeder drum D may likewise be equipped with compressed air means, as indicated in the drawings, being provided with a hollow shaft, $d'$, connected to a source of compressed air, the shaft being vented to the interior of the drum and the peripheral walls, $a^4$, perforated as at $d^5$. A shield, X, having hubs $x''$ mounted on shaft $d'$, within which hubs the shaft $d'$ rotates, is sustained in proper position by a counterweight, W. The shield X permits the free escape of air only at points where it is desirable, to air-wash the cotton, to press it against the screen, 2, and to assist in ejecting the cotton through the exit, $e$.

Preferably a portion of the inner surface of the drum 1 is protected against the direct action of the compressed air within the drum by a shield, X, mounted upon hubs $x''$ on the shaft 11, the shaft rotating within the hubs and the shield being maintained in proper position by a depending counter-weight, W.

The drums are connected to rotate in unison by suitable pulleys $h$ and $h'$ and belt $h''$ and a screw conveyor, $c$, may be mounted beneath the screen, within the casing, and driven by pulley $c'$, to evacuate the dust and dirt removed from the cotton in the cleaning process.

On shaft 11 is mounted an eccentric $j$, actuating a rod $j^1$ which engages a pivoted lever $j^2$ carrying a ratchet $j^3$ which engages and actuates in one direction a gear $j^4$ on the end of the shaft of feed roll $a'$. A second gear $j^5$ on the other feed roll $a^1$ meshes with gear $j^4$ to drive the feed rolls in unison.

The operation is as follows: Seed cotton being passed into the feeder-cleaner at, $a$, usually from a cotton chute under which the machine is disposed, the seed-cotton is engaged by the rollers, $a'$ $a'$, and slightly compressed and formed into a loose bat. The bat is received by the drum, D, turning as indicated by the arrow, Figure 1, and moved by spikes $d$ against the drum 1, rotating as indicated by the arrow, by the spikes $d$ on which drum 1, the cotton bat is carried around opposite the screen 2 which begins, as shown, over the drum 1, and extends to the exit, $e$, of the casing of the feeder-cleaner.

I have shown the shields X in the drawings with a slight clearance between the shield and the inner surface of the drums. This was necessary in order to illustrate clearly the shield. In practice the shield fits the inner surface of the drum rather closely and may also, if desired, be equipped with felt strips along its edges to substantially prevent the passage of air around the edges of the shields. I have not attempted to indicate such packing devices, which are commonly used in such situations.

In cotton cleaners as heretofore constructed, screen surface placed above the center of the drum has not been fully effective, as gravity tended to keep the cotton from contact with the screen and dirt and sand could not fall through the screen. In my new pneumatic cleaner, the air tends to lift the cotton, against gravity, to the upper screen surface against which it is actuated by the rotating drum, and sand and trash is blown through the upper screen, out of the cotton and finds its way to the bottom of the casing and the dirt evacuating means.

Figure 5:
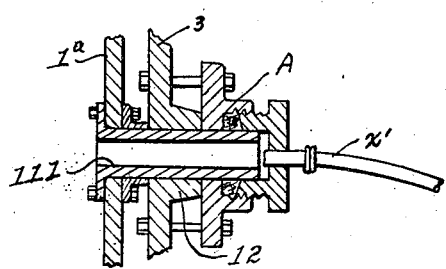
Figure 5 is a detail on an enlarged scale of a hollow bearing.

I have shown in Figure 5 a modified form of air inlet, in which a hollow bearing or short shaft 111 passes through the end wall $1^a$ of a drum and is secured thereto, and passes also through a hollow bearing 12 in the side of the casing. Through this hollow bearing compressed air may be introduced into the drum, as will be plain.

I claim:

1. In a cotton cleaner, a hollow rotary drum having closed ends and a multiplicity of perforations in its peripheral walls, axially supported for rotation within a screened casing, enclosing said drum; that casing; means to introduce air under compression into said drum, to be discharged through said perforations.

2. In a cotton cleaner, a hollow rotary drum having closed ends and a multiplicity of perforations in its peripheral walls; a hollow bearing at the axis of a closed end; a screened casing enclosing the drum; a hollow bearing on the casing to support the hollow bearing on the drum; means to introduce compressed air through the hollow bearings of the casing and drum end, into the hollow drum, to be discharged through the peripheral perforations.

3. In a cotton cleaner, a hollow rotary drum having closed ends and a multiplicity of perforations in its peripheral walls; a hollow shaft, disposed along the longitudinal axis of the drum and having vents from the inside of the shaft, within the drum; a screened casing enclosing the drum; bearings for the shaft in the sides of said casing; means to introduce compressed air, through the hollow shaft into the hollow drum, to be discharged through the peripheral perforations.

4. In a cotton cleaner, a hollow rotary drum having a multiplicity of perforations in its peripheral walls; a screen adjacent to said drum to hold the cotton adjacent to said drum; a shield supported within said drum in an adjusted position to cover a portion of the inner surface of the drum; and cover successively a part of the perforations therein; means to cause air to be discharged through the uncovered perforations during the rotation of the drum.

5. In a cotton cleaner, a hollow rotary drum having closed ends and a multiplicity of perforations in its peripheral walls; a hollow bearing at the axis of a closed end; a shield supported within said drum in an adjusted position to cover a portion of the inner surface of the drum and cover successively part of the perforations therein; a screened casing enclosing the drum; a hollow bearing on the casing to support the hollow bearing on the drum; means to introduce compressed air through the hollow bearings of the case and drum end, into the hollow drum, to be discharged through the uncovered perforations during the rotation of the drum.

6. In a cotton cleaner, a hollow rotary drum having closed ends and a multiplicity of perforations in its peripheral walls; a hollow shaft, disposed along the longitudinal axis of the drum and having vents from the inside of the shaft, within the drum; a shield supported within said drum, upon said shaft, in an adjusted position to cover a portion of the inner surface of the drum and to cover successively a part of the perforations therein; a screened casing enclosing the drum; means to introduce compressed air through the hollow shaft into the hollow drum, to be discharged through the uncovered perforations during the rotation of the drum.

Signed at Boston, Massachusetts, this twenty seventh day of February, 1923.

FELIX RACKEMANN.